UNITED STATES PATENT OFFICE.

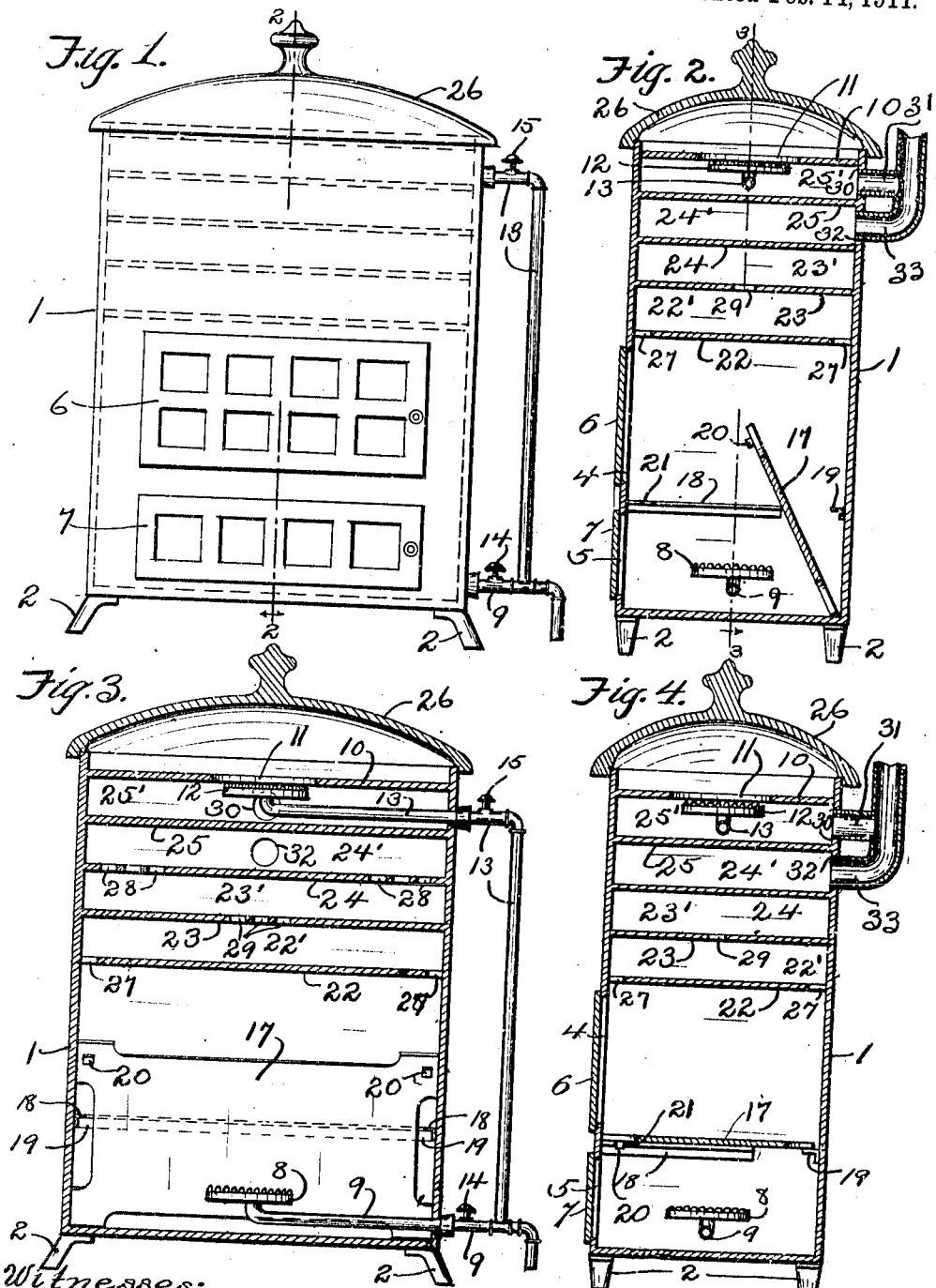

ARCHIE PHILO, OF CLEVELAND, OHIO.

HEATING-STOVE.

984,296.　　　Specification of Letters Patent.　　Patented Feb. 14, 1911.

Application filed December 15, 1908. Serial No. 467,607.

*To all whom it may concern:*

Be it known that I, ARCHIE PHILO, a citizen of the United States of America, residing at Cleveland, in the county of Cuyahoga and State of Ohio, have invented certain new and useful Improvements in Heating-Stoves; and I hereby declare the following to be a full, clear, and exact description of the invention, such as will enable others skilled in the art to which it pertains to make and use the same.

This invention relates to new and useful improvements in stoves.

The object of this invention is to provide a stove, of the type commonly known as parlor heating stoves, which can be readily converted into a cooking stove.

My invention also consists in providing means whereby a portion of the main heating chamber can be converted into an oven.

My invention also consists in the features of construction and combination of parts described in the specification, pointed out in the claim and illustrated in the accompanying drawings.

In the accompanying drawings Figure 1 is a front elevation of a stove embodying my invention. Fig. 2 is a section on line 2—2, Fig. 1. Fig. 3 is a section on line 3—3, Fig. 2. Fig. 4 is a similar view to Fig. 2 but showing the reflector plate arranged in position to form the bottom of the oven.

Again referring to the drawings 1 represents the outer casing of the stove which may be formed of any suitable material and is preferably provided with legs 2. In the front part of the casing are formed openings 4 and 5 which are provided with hinged doors 6 and 7 respectively, in the usual manner. In the lower part of the stove is arranged a burner 8 which is provided with a supply pipe 9. At the top of the stove is arranged a horizontal partition 10 having an opening 11 in the center thereof. Below this partition is arranged a burner 12 which has a supply pipe 13 which is preferably connected with the supply pipe 9. The supply pipes 9 and 13, are preferably provided with valves 14 and 15 respectively. In the lower part of the stove behind the main burner is arranged a removable reflector plate 17 which when the stove is simply used for heating purposes acts as a reflector to throw the heat against the front part of the stove from which it is radiated into the room. On each side of the casing is secured a support or flange 18 which extends from the front of the stove to within a short distance of the back thereof, and on the back of the casing is secured a similar support or flange 19. The rear ends of the supports 18 hold the reflector plate 17 in position when it is used for the purpose of a reflector, but when it is desired to use the plate to form the bottom of an oven the reflector plate is drawn up and arranged horizontally on the supports 18 and 19. In the supports 18 are preferably formed openings 21 and on the reflector plate 17 are formed lugs 20 which enter the said opening 21 when the plate is in a horizontal position and prevent its displacement. In the upper part of the casing are arranged a series of partitions 22, 23, 24 and 25 which divide the upper part of the stove into four chambers 22', 23', 24' and 25'. In the partitions 22 and 24 are formed openings 27 and 28, respectively, which are arranged near the sides of the casing, and in the partition 23 are formed centrally arranged openings 29. The partition 25 is imperforate and in the wall of the chamber 25' is formed an opening 30 which communicates with the flue 31 and in the wall of the chamber 24' is formed an opening 32 which communicates with the flue 33.

The warm air will rise freely until it strikes the partition 22 and will then pass through the openings 27 near the sides of the casing into the chamber 22' and will then pass through the openings 29 in the center of the partition 23 and through the openings 28 in the partition 24 near the sides of the casing and then into the chamber 24' from whence it will pass by way of the flue 33. The products of combustion from the burner 12 will be carried away through the flue 31.

The stove is preferably provided with a removable ornamental top 26.

It will thus be seen that I have provided a stove having all the advantages of an ordinary heating stove but which can be readily converted so as to be used for cooking purposes when desired.

What I claim is,—

In a stove, the combination of a main chamber, a burner arranged in the lower part of said chamber, a plate, means for supporting said plate at the rear of said burner so as to serve as a reflector, means for supporting said plate above said burner so as to serve as the bottom for an oven, a series of partitions arranged in the upper part of said chamber and dividing the upper part thereof into a series of smaller chambers, said partitions provided with passages connecting the chambers and arranged so as to cause the air and gases to travel from the sides to the center of the stove and then to the sides again while passing through said chambers and a flue connected with the uppermost chamber.

In testimony whereof, I sign the foregoing specification, in the presence of two witnesses.

ARCHIE PHILO.

Witnesses:
VICTOR C. LYNCH,
N. L. McDONNELL.